United States Patent [19]

Duerdoth et al.

[11] 3,760,107

[45] Sept. 18, 1973

[54] TIME DIVISION MULTIPLEX COMMUNICATION SYSTEMS

[75] Inventors: Winston Theodore Duerdoth, Ruislip; Charles Joseph Hughes, London; John Frederick Hesketh, Greenford; William Desmond Morton, Rickmansworth, all of England

[73] Assignee: Her Majesty's Postmaster General, London, England

[22] Filed: Mar. 22, 1971

[21] Appl. No.: 126,527

Related U.S. Application Data

[62] Division of Ser. No. 782,541, Dec. 12, 1968.

[30] Foreign Application Priority Data

Dec. 11, 1967 Great Britain .................. 56,149/67

[52] U.S. Cl.... 179/15 BF, 179/15 AT, 179/175.2 R

[51] Int. Cl. ............................................ H04j 3/14

[58] Field of Search .................. 179/18 EB, 18 EA, 179/18 E, 15 BF, 175.2 R, 22, 27 G, 18 ES, 175.2 C, 15 AT, 175.21, 175.23

[56] References Cited

UNITED STATES PATENTS

| | | | |
|---|---|---|---|
| 3,551,601 | 12/1970 | Sloan | 179/18 E |
| 3,423,539 | 1/1969 | Page | 179/18 E |

OTHER PUBLICATIONS

Bell System Technical Journal; Vol. XLIII, No. 5, Parts 1 and 2; September 1964, pp. 2249–2253 & pp. 1984–1985.

*Primary Examiner*—Kathleen H. Claffy
*Assistant Examiner*—David L. Stewart
*Attorney*—Hall & Houghton

[57] ABSTRACT

A time division multiplex telephone system has testing apparatus for testing the setting-up of a communication path between two subscribers before the path is switched through to the subscribers. Circuits responsive to signals emitted by the testing apparatus initiate a further attempt to set up the communication path if the testing apparatus signals that the test made on the set up connection indicate that the setting up is not successful.

2 Claims, 2 Drawing Figures

WINSTON T. DUERDOTH, CHARLES J. HUGHES, JOHN F. HESKETH & WILLIAM D. MORTON

INVENTORS

BY

Hall & Houghton ATTORNEY

WINSTON T. DUERDOTH,
CHARLES J. HUGHES,
JOHN F. HESKETH, &
WILLIAM D. MORTON,

INVENTORS

BY [signature]

ATTORNEY

TIME DIVISION MULTIPLEX COMMUNICATION SYSTEMS

This is a division of Application Ser. No. 782,541 filed Dec. 12, 1968.

BACKGROUND OF THE INVENTION

This invention relates to time division multiplex (TDM) telecommunication systems especially those in which pulse code modulation is used, and in particular to automatic TDM telephone exchange systems as described in co-pending Patent Application No. 782,541 by the present Applicants and others (now U.S. Pat. No. 3,622,705 issued Nov. 23, 1971) and the content of which is incorporated herein by reference and constitutes the setting to which the present invention relates.

In such systems, registers are employed to receive and store input information and control the attempt of setting up a connection through the system. After a successful set-up is completed or if this is not possible, a signal, e.g. busy tone, is returned, and the controlling register is released.

It is an object of the present invention to provide improved register facilities.

SUMMARY OF INVENTION

According to the present invention, a time division multiplex communication system comprises test initiating means for confirming a successful attempt to set-up of a connection, and means for initiating a further attempt to set up the connection if the test initiating means do not confirm a successful first attempt.

Preferably, the system further includes connection hold means for holding the initial setting-up until the further attempt has been made.

In one particular embodiment of the invention, record-providing equipment is included, such equipment providing a record identifying the route over which an unsuccessful initial setting-up was made.

BRIEF DESCRIPTION OF THE DRAWINGS

An embodiment of the invention will now be described with reference to the accompanying drawings in which.

DESCRIPTION OF PREFERRED EMBODIMENTS

Figure 1:
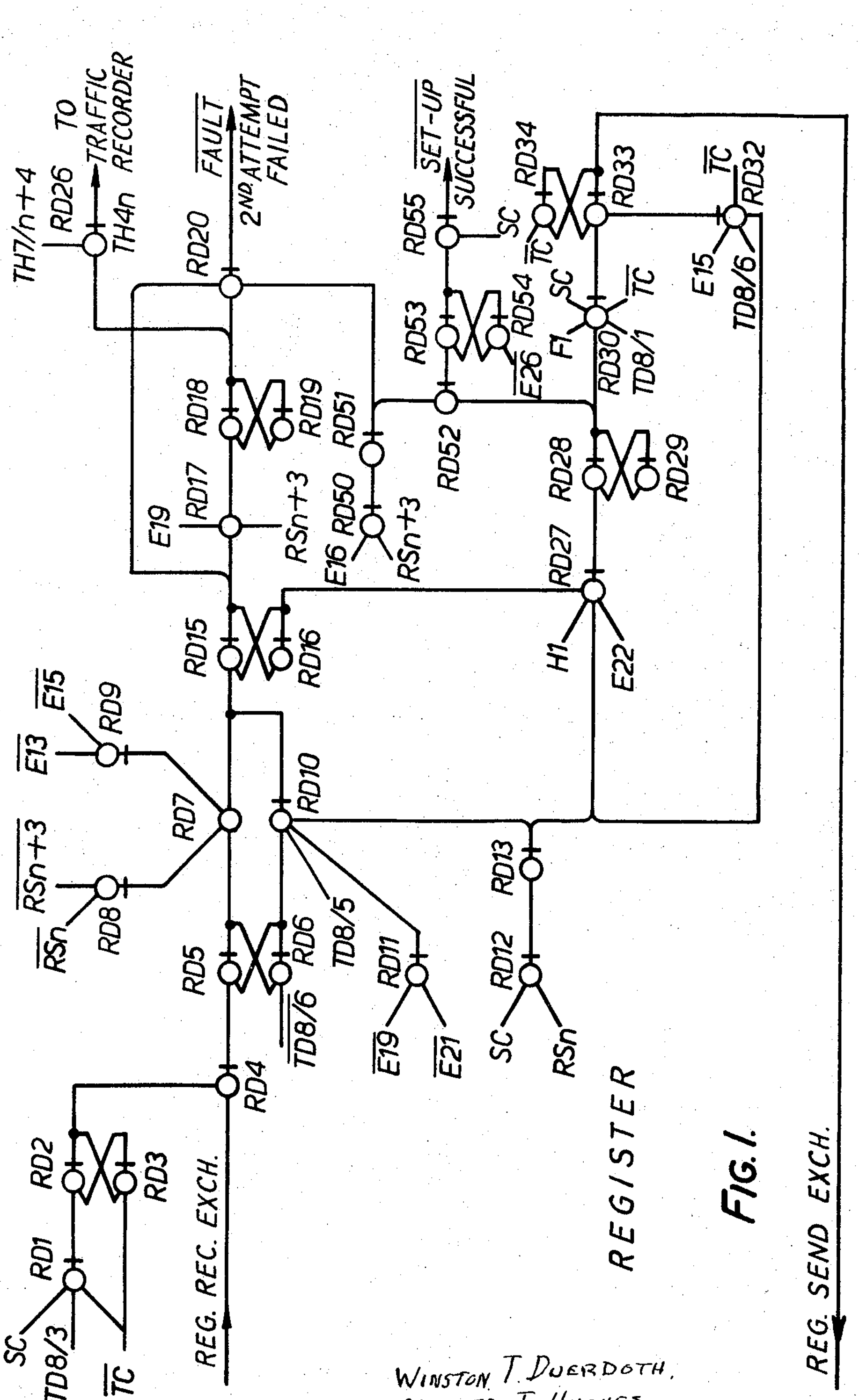
FIG. 1 shows in logical form the circuit in the register.

The time division multiplex communication system of which the embodiment to be described forms a part is that set out in the parent Specification referred to above and to which reference should be made for details of the system itself.

As has been stated in the parent Specification referred to above, the diagram represents NAND gates to positive logic and its operation will be described in terms of voltage levels of two binary states which are used to represent the 0 and 1 conditions of binary logic. The state that results in the more positive output voltage is referred to as HIGH and represented by logical 1, and that which results in the more negative output voltage as LOW and represented by logical 0. Leads on the diagram are labelled in accordance with this nomenclature. For example, a lead labelled SET-UP SUCCESSFUL indicates that the named signal occurs when the condition of the lead is in the LOW or logical 0 state, no signal is given whereas the absence of the bar drawn over the designation of the lead would indicate that the named signal occurs when the condition of the lead is HIGH or in the logical 1 state.

The register operates on a TDM basis for the reception and storing of received information relating to a call, and therefore more than one call can be in this state in a REGISTER at the same time. Only one connection can be set-up at a time and for this reason, each REGISTER is scanned periodically, for example for 3.5 ms every 98 ms, during which time it can attempt to set-up a particular connection.

Each REGISTER is scanned in turn for a period of RSn (e.g. 3.5 ms) and 28 values of '*n*' are available. A REGISTER scan period, i.e. say RS 1, comprises 7 multiframes giving 28 frames synchronised with frames F1-4, these 28 frames being designated identified by waveforms E 1-28. Details of the generation of the waveforms are to be found in column 4 of U.S. Pat. No. 3,622,705.

The Specification referred to above describes the sequence of events leading to the HOLD REGISTER condition. A HOLD signal is obtained and if this persists for more than a predetermined time, 3 secs. in the example being described, the call is to be timed out and number unobtainable tone returned. The REGISTER is also released. Further information regarding the HOLD REGISTER condition occurs in columns 7 and 8 of U.S. Pat. No. 3,622,705.

In the system described in the Specification mentioned above, A, B and C switches are employed of which the A switch is written at time E10, the B switch is written at time E9 and the C switch is written at time E15 or E17. Details of the manner in which the switches are written appears in columns 15 and 16 of U.S. Pat. No. 3,622,705.

A connection is set-up during the REGISTER scan period according to a fixed program controlled by the 28 waveforms E1-28. Complete details of the set-up procedure are to be found in U.S. Pat. No. 3,622,705 commencing at the foot of column 4.

Figure 2:
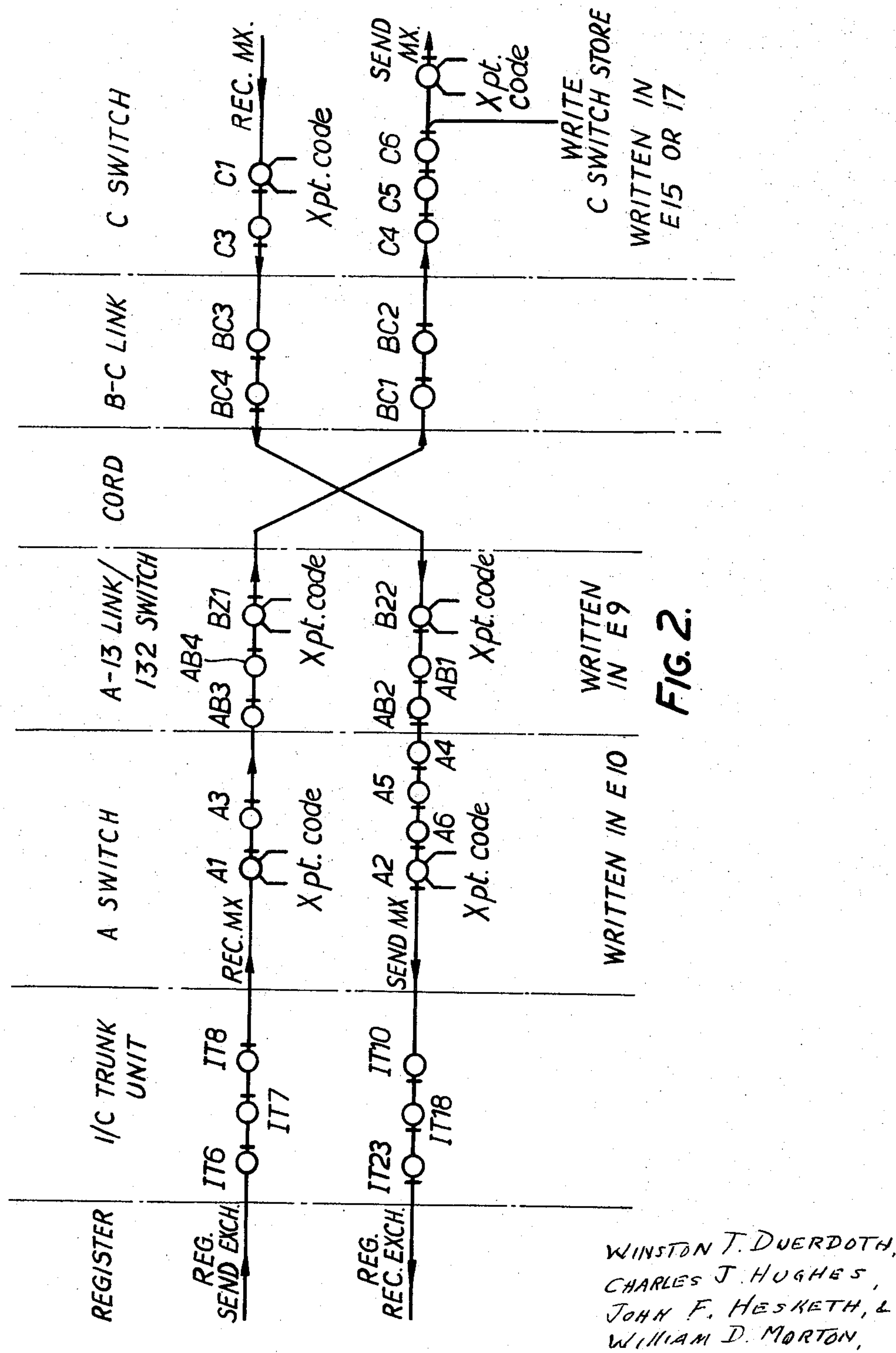
FIG. 2 shows in logical form a connection path through the exchange system.

Of the accompanying drawings, FIGS. 1 and 2 are, respectively, simpler versions of FIGS. 8*a*, 8*b*, 8*e* and 8*f* combined together and FIGS. 3*c*, 3*d*, 5*a*, 5*b*, 6*a*, 6*b*, 14 and 15*a* combined together of U.S. Pat. No. 3,622,705.

The setting up sequence is briefly that the REGISTER sends a forward marking signal to INDICATE the calling channel and a backward marking signal to MARK the route required. Checks are made to ensure (a) that no signals are received from the exchange before the connection is set-up and (b) that the CIRCUIT FREE signal is received after the set-up is completed. The marking signals are then removed, a test signal is sent to the terminating end, and a further check is made to see that the CIRCUIT FREE signal is removed. If it is, the REGISTER releases.

In the event of any of the checks not being satisfactory, a second attempt is made.

REGISTER SEND EXCHANGE HOLD

A channel is selected before the start of the REGISTER scan period, and the REGISTER immediately starts to send an EXCHANGE HOLD signal on the REG.SEND.(EXCHANGE) (FIG. 2) lead in all EVEN frames. The signals are delayed by one-half digit, i.e.

they are sent out at TD 8/1.$\overline{TC}$. A LOW output at TD 8/1.$\overline{TC}$.SC.(F2 + F4) sets the latched gate pair RD 33-34, which is reset by $\overline{TC}$. This signal is sent during the whole time a channel is selected, except for the period E2-8 of RSn, when it is inhibited in order to release a B-SWITCH which may be held from a first attempt, and constitutes the hold signal for the initial attempt to set-up the connection.

INDICATE I/C JUNCTION

The forward INDICATE signal is sent out in the selected channel at the start of RSn and is repeated every frame until the CIRCUIT FREE signal is received back from the exchange indicating that the set-up has been completed. The INDICATE signal is a HIGH signal delayed by one-half digit and stretched to the beginning of TD 8/6. Further details of the procedure just described are to be found in column 10 of U.S. Pat. No. 3,622,705.

At the start of RSn the CIRCUIT AVAILABLE latched gate pair RD28-29 will be reset and the output of gate RD29 will be HIGH. The INDICATE signal is then generated by setting the latched gate pair RD37-38 at $\overline{TC}$.TD 8/1 via gate RD36, resetting it at TD 8/6, and gating the output with RSn.SC in gate RD39.

The signal is inverted before being sent out to the REGISTER CONNECTION SWITCH, and a check is made by gate RD41 to ensure that a permanent INDICATE is not being sent out. Further reference to the operation is found in column 10 lines 47–53 of U.S. Pat. No. 3,622,705.

The REGISTER CHECKS made are, in detail, as follows:

i. in E 13 and E 15 of RSn, that there are no false signals being received on the REG. REC. EXCH. lead from the C switch through the A and B switches, the crosspoints being operated in both the A and B switches, but not in the C switch. The correct condition on the REG. REC. EXCH. lead under this condition is that D1 should be LOW(O) in both the ODD and EVEN frames, and if so, the C switch is written in either E15 or E17.

ii. that having written the C SWITCH in E$\overline{15}$, that in E 19 and E 21 the CIRCUIT FREE signal is received, i.e. D1 is HIGH(1) in the ODD frames.

iii. after sending a seizure signal in E 25 to the terminating end of the called PCM system, that in E 13 and E 15 of RS($n$+3) the CIRCUIT FREE signal is removed, i.e. D1 should be LOW(O) in both ODD and EVEN frames.

Failure of any of these checks results in a second attempt being made by the REGISTER to set-up the connection as is explained at column 11 of U.S. Pat. No. 3,622,705.

The check circuits to make the checks set out above will now be explained in more detail, the REG. REC. EXCH. lead being gated at gate RD4 by a timing waveform corresponding to TC.TD8/3 generated by gates RD1-3.

i. The correct condition on the REG. REC. EXCH. lead is that D1 should be LOW(O) in both ODD and EVEN frames.

If any false signals are received they will be HIGH(1) and will result in the latched-gate pair RD5-6 being set and the output from gate RD5 stretched to TD 8/6. The output of gate RD5 is sampled at E13 and E15 of RSn via gates RD8 and RD9, and if the latched-gate pair RD5-6 is set, the SECOND ATTEMPT latched-gate pair RD15-16 is set via gate RD7.

ii. the REGISTER writes the C SWITCH in E15 or E17 of RSn over the REG. SEND EXCH. lead and via the A and B SWITCH crosspoints.

With the C SWITCH crosspoints operated, CIRCUIT FREE signal i.e. D1 HIGH (1) in ODD frames, should be received from the terminating end of the outgoing PCM system. If this is received, the latched-gate pair RD5-6 should be set and the SECOND ATTEMPT latched-gate pair RD15-16 will not be set. Further details of this operation appear in column 16 of U.S. Pat. No. 3,622,705.

If the CIRCUIT FREE signal, i.e. 1's in ODD frames, is not received, then latched-gate pair RD5-6 will not be set and the output of gate RD6 is sampled at E19 and E21 of RSn in gate RD10 via gate RD11, and latched-gate pair RD15-16 will be set. Reference should be made to columns 11 and 16 of U.S. Pat, No. 3,622,705 for more detail of the procedure just described.

iii. if the two checks described in (i) and (ii) are satisfactory, i.e. the latched-gate pair RD15-16 will not have been set, and the circuit available latched-gate pair RD28-29 is set at SC.E22.Rsn via gate RD27, resulting in a seizure signal in TC.TD8/1.SC.F1 being sent via gate RD30 and latched-gate pair RD33-34 on REG. SEND EXCH. lead commencing in E25 of RSn and continuing until the set-up is completed.

This seizure signal received at the terminating end of the outgoing PCM system should result in the CIRCUIT FREE signal being changed to CIRCUIT BUSY, i.e. D1 LOW(O) in both ODD and EVEN frames. This is checked on REG. REC. EXCH. lead as described in (i), the output of gate RD5 being sampled in E13 and E15, but of RS($n$+3) via gates RD8 and RD9.

SET-UP SUCCESSFUL

If the REGISTER checks described are successful, the SECOND ATTEMPT latched-gate pair RD15-16 will not have been set and at E16 of RS(n+3) the output of gate RD16 will be HIGH.

The CIRCUIT AVAILABLE latched-gate pair RD28-29 has already been set and the output of gate RD28 is HIGH. Under these conditions latched-gate pair RD53-54 is set via gate RD52.

The output of gate RD53 is gated with the selected channel in gate RD55 to provide the output signal SET-UP SUCCESSFUL. Reference is made to columns 11 and 12 of U.S. Pat. No. 3,622,705 for further details.

SECOND ATTEMPT

If the REGISTER checks described are not successful the second attempt latched gate pair RD15-16 is set. The checks are completed by E15.RS($n$+3) and at E19 the output of the latched-gate pair RD15-16 is sampled at gate RD17 and if a second attempt is required the latched-gate pair RD18-19 is set. The output is gated with TH4/n and TH7/$n$ +4 to provide a single 5 $\mu$ s pulse at the beginning of RS($n$+4) which provides the SECOND ATTEMPT output for recording purposes.

The second attempt is made in the next RSn period following the first attempt, and the set-up procedure is exactly as described for that attempt. If one of the REGISTER checks is faulty the second attempt latched-gate pair RD15-16 is again set, but now that the latched-gate pair RD18-19 is set a LOW output is obtained from gate RD20 at SC.E16.RS($n$+3) indicating that the second attempt is unsuccessful. This output causes the N.U. tone STORE to be written and this will result in the removal of the EXCHANGE HOLD signal from the $\overline{\text{REG. REC. (LINE)}}$.

The latched gate pair RD 18–19 is reset from gate RD21 via gate RD22 when the REGISTER HOLD disappears, and from the output of gate RD55 if the second attempt is successful.

REGISTER RELEASE

If the set-up is unsatisfactory for any reason a signal is sent from the REGISTER to write the N.U. tone STORE. This is a HIGH signal in D1.F2 on the REG. SEND (LINE). As is described in the Specification referred to above, all those REGISTER fault indications that occur at channel time are included in three of the inputs to gate RD81 and the fourth input is from gate RA64. The HIGH output from gate RD81 in the event of a fault is gated with the SHORT HOLD at gate RD82 and used to write the REGISTER RELEASE STORE.

A $\overline{\text{CALLS LOST}}$ output is provided from gate RD82 to the TRAFFIC RECORDER.

The output of the REGISTER RELEASE STORE is gated with R2 at gate RD60 and applied to gate RD61, from which it is sent to REG. SEND. (LINE) lead. An explanation of the foregoing is to be found in column 12 of U.S. Pat. No. 3,622,705.

PATH READ OUT

If the set up is unsuccessful it may be desired to print out the details of the unsatisfactory attempt.

During E23 a PATH READER interrogates the common point of the INDICATE paths in the *i/c* TRUNK UNIT. If a channel pulse is returned, it implies an unsuccessful attempt. The returned channel and the identity of the *i/c* TRUNK UNIT is passed to a PRINT STATICISER and a signal is produced to interrogate the B SWITCHES and the *o/g* TRUNK UNITS during E24. The identity of the selected B SWITCH, selected CORD, and marked *o/g* TRUNK UNITS is returned and passed to the PRINT STATICISER. The identity of the REGISTER is deduced from the REG. SCAN PERIOD in which this occurs so that the identity of the REGISTER can also be staticised.

A failure to set up thus results in a message being printed out giving the REGISTER, calling channel, *i/c* TRUNK UNIT, B SWITCH, CORD and wanted *o/g* ROUTE.

The PATH READ OUT is dealt with in column 20 of U.S. No. 3,622,705.

We claim:

1. A time division multiplex communication system comprising in combination:

1. a plurality of communication channels;
2. a number of switching stages including a first switching stage and a last switching stage for providing a required connection between first and second channels of said plurality;
3. control means for locating through each of said switching stages a path suitable for the required connections; and
4. means for setting up, once each said path is located, an initial connection through said first switching stage as far as but not through said last switching stage;
5. said control means including test initiating means for
   - A. making a test of the condition of said set-up initial connection,
   - B. effecting an extension of said set-up initial connection through said last switching stage if said test is successful, and further
   - C. making a test of the condition of said extended set-up initial connection to verify whether a signal is receivable by said control means over said exended set-up initial connection, and
6. said control means including further means responsive to the failure of either of said tests for attempting to set-up another initial connection.

2. A system as claimed in claim 1, which further comprises hold means for holding at least a part of said set-up initial connection until the attempt to set-up another initial connection has been made.

* * * * *